(12) United States Patent
Piche et al.

(10) Patent No.: US 9,665,979 B2
(45) Date of Patent: *May 30, 2017

(54) RENDERING DAMAGED-ENHANCED IMAGES IN AN INTERACTIVE COMPUTER SIMULATION

(71) Applicant: CAE Inc., Saint-Laurent (CA)

(72) Inventors: Patrick Piche, Saint-Eustache (CA); Jonathan Breton, Laval, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 14/870,641

(22) Filed: Sep. 30, 2015

(65) Prior Publication Data

US 2016/0093114 A1    Mar. 31, 2016

Related U.S. Application Data

(63) Continuation of application No. 14/501,132, filed on Sep. 30, 2014, now Pat. No. 9,418,477.

(51) Int. Cl.
*G06T 1/20* (2006.01)
*G06T 15/04* (2011.01)
*G06T 15/30* (2011.01)
*G06T 17/10* (2006.01)
*G06T 17/20* (2006.01)
*G06T 19/20* (2011.01)
*G06F 15/173* (2006.01)
*G06T 15/00* (2011.01)
*G06F 12/16* (2006.01)
*G06T 13/00* (2011.01)
*G06F 17/30* (2006.01)
*G06G 7/48* (2006.01)

(52) U.S. Cl.
CPC .............. *G06T 17/205* (2013.01); *G06T 1/20* (2013.01); *G06T 15/04* (2013.01); *G06T 15/30* (2013.01); *G06T 17/10* (2013.01); *G06T 17/20* (2013.01); *G06T 19/20* (2013.01); *G06F 12/16* (2013.01); *G06F 15/173* (2013.01); *G06F 17/30* (2013.01); *G06G 7/48* (2013.01); *G06T 13/00* (2013.01); *G06T 15/00* (2013.01); *G06T 2210/21* (2013.01); *G06T 2219/2021* (2013.01)

(58) Field of Classification Search
None
See application file for complete search history.

(56) References Cited

U.S. PATENT DOCUMENTS 6,677,949 B1    1/2004  Gioia

*Primary Examiner* — Mark Zimmerman
*Assistant Examiner* — Yu-Jang Tswei
(74) *Attorney, Agent, or Firm* — Gowling WLG LLP; Benoit Yelle

(57) ABSTRACT

Method and computer system for rendering damaged-enhanced images in an interactive computer simulation comprising an interactive computer generated environment. During the simulation, an input is received from a user of the simulation for triggering a virtual impact having an effective radius and coordinates of the virtual impact are determined on at least one 3D polygon mesh of the interactive computer generated environment. Thereafter, simplified calculation of at least one newly formed 3D polygon mesh from the virtual impact at the coordinates is performed by removing a portion of a sphere, computed from the effective radius, from the at least one 3D polygon mesh, thereby defining the newly formed 3D polygon mesh(es). At least one damaged-enhanced image is then rendered for display of the newly formed 3D polygon mesh(es) from a field of view of the user of the interactive computer simulation.

20 Claims, 12 Drawing Sheets

US 9,665,979 B2

RENDERING DAMAGED-ENHANCED IMAGES IN AN INTERACTIVE COMPUTER SIMULATION

PRIORITY STATEMENT

This non-provisional patent application claims priority based upon the prior U.S. non-provisional patent applications entitled "RENDERING DAMAGED-ENHANCED IMAGES IN A COMPUTER SIMULATION", application Ser. No. 14/501,132, filed Sep. 30, 2014, in the name of CAE Inc, which is hereby incorporated by reference in its entirety.

TECHNICAL FIELD

The present disclosure relates to computer generated images and, more particularly, to generating images using a computer based on a dynamically modifiable environment.

BACKGROUND

In computer simulation, an important aspect is to credibly replicate an actual environment where various dynamic events may be triggered (e.g., collision or explosion causing damages to a modeled structure, etc.). In order to remain credible, the image generation in the computer simulation has to take these events into account while maintaining an image rate that is high enough to be seen as fluid from the user perspective. However, a lot of material resources (e.g., processing power, memory and/storage space, etc.) is required to dynamically consider such dynamic events (for instance, especially in a multi-user environment). Consequently, it is often necessary to use pre-determined animations to remain within accessible material resources.

The present invention aims at improving the manner in which dynamic events are considered during an interactive computer simulation while taking into consideration usage of the material resources.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect of the present invention in accordance with a first set of embodiments is directed to a method for rendering damaged-enhanced images in an interactive computer simulation. The method comprises, during the interactive computer simulation comprising an interactive computer generated environment, receiving an input from a user of the interactive computer simulation for triggering a virtual impact having an effective radius and determining coordinates of the virtual impact on at least one three dimensional (3D) polygon mesh of the interactive computer generated environment. The method then follows with simplifying calculation of at least one newly formed 3D polygon mesh from the virtual impact at the coordinates by removing a portion of a sphere, computed from the effective radius, from the at least one 3D polygon mesh of the computer generated environment, thereby defining the at least one newly formed 3D polygon mesh. The method continues with rendering at least one damaged-enhanced image for display of the at least one newly formed 3D polygon mesh from a field of view of the user of the interactive computer simulation.

The simplified calculation of the at least one newly formed 3D polygon mesh may be performed in real-time priority processing. The simplified calculation of the at least one newly formed 3D polygon mesh may further optionally be performed by a decentralized processing unit in a limited number of milliseconds. The decentralized processing unit may be associated with an interactive simulated vehicle of the interactive computer generated environment and the field of view may be defined from a position of the user within the interactive simulated vehicle. In this example, the method may further comprise, at a centralized processing unit, computing the at least one newly formed 3D polygon mesh from the determined coordinates independently from the decentralized processing unit and in non-real-time priority processing and, from the centralized processing unit, persistently updating a storage module associated to the interactive computer simulation with the at least one newly formed 3D polygon mesh. The method may then further optionally comprise loading, at a second decentralized processing unit of the interactive computer simulation, the at least one newly formed 3D polygon mesh data from the storage module, the second decentralized processing unit being associated with a second interactive simulated vehicle of the interactive computer generated environment having a second field of view defined from a second user's position within the second interactive simulated vehicle.

Optionally, the method may further comprise, before beginning the interactive computer simulation, loading the interactive computer generated environment from a storage module and identifying one or more opened polygon meshes forming non-watertight meshes in the interactive computer generated environment. In this example, the method may also further comprise, for each identified opened polygon mesh, attempting to close the corresponding polygon mesh and, if not possible, marking the corresponding polygon mesh as un-damageable and, prior to removing the portion of a sphere, verifying that the at least one 3D polygon mesh is not marked as un-damageable in the database.

The method may optionally further comprise, before removing the portion of a sphere, determining that each of the at least one 3D polygon mesh forms a watertight mesh.

The method may optionally further comprise, after determining the coordinates, rendering at least one temporary image for display comprising a distracting visual effect at the determined coordinates at least until rendering the at least one damaged-enhanced image is performed.

Optionally, rendering the at least one damaged-enhanced image may further comprises applying a damage texture, fading outwardly from the coordinates and exceeding the effective radius, on the at least one newly formed 3D polygon mesh.

A second aspect of the present invention is directed to a computer system for rendering damaged-enhanced images in an interactive computer simulation. The computer system a processor module for i., during the interactive computer simulation comprising an interactive computer generated environment, receiving an input from a user of the interactive computer simulation for triggering a virtual impact having an effective radius, ii. determining coordinates of the virtual impact on at least one three dimensional (3D) polygon mesh of the interactive computer generated environment and iii. simplifying calculation of at least one newly formed 3D polygon mesh from the virtual impact at the coordinates. The simplified calculation is performed by removing a portion of a sphere, computed from the effective radius, from the at least one 3D polygon mesh of the computer generated environment, thereby defining the at least one newly formed 3D polygon mesh. The processor module comprises an image generator module for iv. rendering at least one damaged-enhanced image for display of the at least one newly formed 3D polygon mesh from a field of view of the user of the interactive computer simulation.

The processor module may perform the simplified calculation of the at least one newly formed 3D polygon mesh in real-time priority processing. The simplified calculation of the at least one newly formed 3D polygon may further be performed by a decentralized processing unit associated with an interactive simulated vehicle of the interactive computer generated environment, the field of view being defined from a position of the user within the interactive simulated vehicle. A centralized processing unit may further be provided for computing the at least one newly formed 3D polygon mesh from the determined coordinates, wherein computing is performed independently from the decentralized processing unit and is performed in non-real-time priority processing and storing the computed at least one newly formed 3D polygon mesh in a storage module associated with the interactive computer simulation. A second decentralized processing unit may further obtain the at least one newly formed 3D polygon mesh data from the storage module, the second decentralized processing unit being associated with a second interactive simulated vehicle of the interactive computer generated environment having a field of view defined from a second user's position within the second interactive simulated vehicle.

The processor module may further optionally be for, before beginning the interactive computer simulation, loading the interactive computer generated environment from a memory module and for identifying one or more opened polygon meshes forming non-watertight meshes in the interactive computer generated environment. The processor module may, for each identified opened polygon mesh, attempt to close the corresponding polygon mesh and, if not possible, marking the corresponding polygon mesh as un-damageable in the storage module and, prior to removing the portion of a sphere, verify that the at least one 3D polygon mesh is not marked as un-damageable in the storage module.

The processor module may further optionally be for, before removing the portion of a sphere, determining that each of the at least one 3D polygon mesh forms a watertight mesh.

The image generator module may further be for, after determination of the coordinates by the processor module, rendering at least one temporary image for display comprising a distracting visual effect at the determined coordinates at least until rendering the at least one damaged-enhanced image is performed.

The image generator module may further render the at least one damaged-enhanced image by further applying a damage texture, fading outwardly from the coordinates and exceeding the effective radius, on the at least one newly formed 3D polygon mesh.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
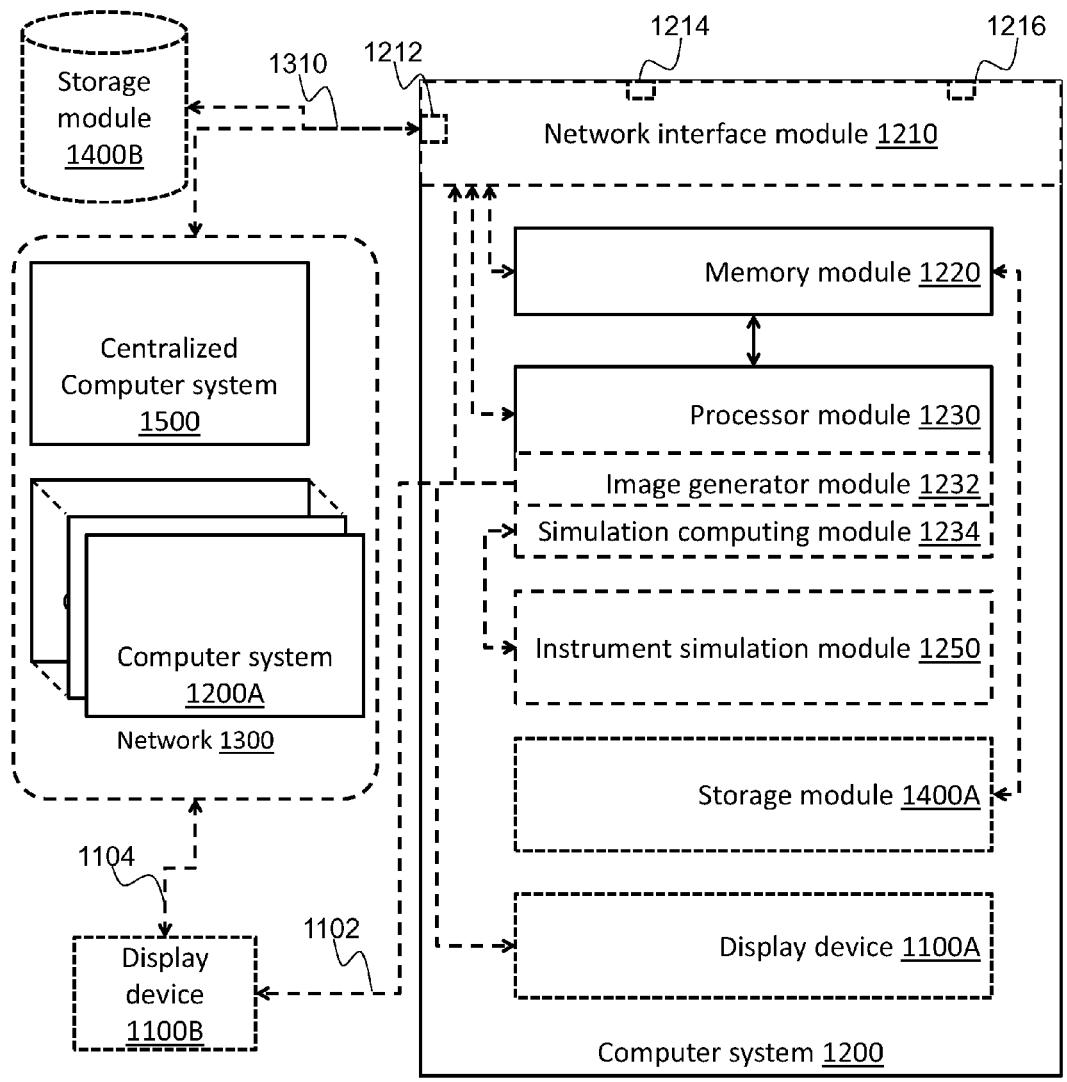
FIG. 1 is a logical representation of an exemplary interactive computer system in accordance with the teachings of the present invention.

Reference is now made to the drawings in which FIG. 1 shows a logical representation of an exemplary computer system 1200 in accordance with the teachings of the present invention. FIG. 1 also shows a logical representation of an optional network 1300 and additional computer systems 1200A . . . G and a centralized computer system 1500 that may be used in certain embodiments of the present invention. The computer system 1200 comprises a processor module 1230 and a memory module 1220. A display device is provided with the computer system (1100A) and/or in communication with the computer system (1100B, both solutions being referred to as 1100). In the example of FIG. 1, the display device 1100B may be in communication with the computer system 1200 via a dedicated port as exemplified via a logical link 1102 or through the network 1300 as exemplified via a logical link 1104. The display device 1100 may comprise at least one physical display unit, and may also comprise many display units of one or more technologies (e.g., Cathode Ray Tube (CRT), Liquid Crystal Display (LCD) screen or projector, any means to project the image onto a screen, mirror and/or display surface, etc.). A storage module may be provided with the computer system 1400A and/or in communication with the computer system 1400B (both solutions being referred to in the description as 1400). The storage devices module 1400A and/or 1400B may represent one or more logical or physical as well as local or remote hard disk drive (HDD) (or an array thereof). The storage devices module 1400 may further represent a local or remote database made accessible to the computer system 1200 by a standardized or proprietary interface. The computer system 1200 may, in certain embodiments, comprise a network interface module 1210 and an instrument simulation module 1250. The processor module may further comprise, or may be seen logically as comprising, an image generator module 1232 and a simulation computing module 1234. The image generator module 1232 may also comprise one or more dedicated graphical processing units (not shown).

The network interface module 1210, e.g., through one or more of its interfaces (e.g., 1212, 1214, 1216), may be used in the context of the present invention to communicate with one or more of the other computer systems 1200A . . . G, the centralized computer system 1500, the display device 1100B (e.g., display data over Ethernet) and/or the storage module 1400B (e.g., to store and/or load a model of a interactive computer simulation). The communication via the network interface module 1210 may be performed through the network 1300 via additional network nodes (e.g., one or more network hub, network switch, network router, firewall, etc.) or directly (e.g., node-to-node cable(s)). The one or more interfaces may use different protocols and physical medium (e.g., local area network (LAN) over twisted pair cables, wireless LAN, wide area network (WAN) over cable, optical fiber, cellular, etc.), metropolitan area network MAN), etc.).

The computer system 1200 may be used as an interactive simulation station (e.g., training device) for an interactive computer simulation comprising an interactive computer generated environment. The computer system 1200 may be used as a standalone interactive simulation system. The computer system 1200 may also be used together with the centralized computer system 1500 to provide the interactive computer simulation. For instance, the centralized computer system 1500 may be referred to as the simulation engine and may provide general simulation management of the interactive computer simulation while the computer system 1200 may be decentralized from the centralized computer system 1500 and may provide user-specific simulation management. Examples of simulation management of the interactive computer simulation include processing simulation-wide events, offline processing of simulation events, pre-processing of the interactive computer generated environment, etc. Examples of user-specific simulation management include image generation considering a field of view/user' position (e.g., using one or more image generator module 1232), runtime processing of simulation events using the simulation computing module 1234 (e.g., using real-time priority processing during the interactive computer simulation in order to treat events happening in the computer simulation within the field of view without affecting the user's perceived quality), processing inputs from interactive simulated instrument(s) manipulated by the user of the interactive computer simulation, providing feedback to the user of the interactive computer simulation through simulated instrument(s) and/or feedback devices (vibration of an instrument, physical movement of a seat of the user and/or physical movement of the whole system, etc.) using the simulation computing module 1234 and the instrument simulation module 1250.

In exemplary embodiments where the interactive computer simulation involves at least the computer system 1200 and the centralized computer system 1500, communications therebetween may be handled in different manner depending on different architecture choices. For instance, the systems 1200 and 1500 may be logically distinct using distributed processing within a single computer system (e.g., virtual machines of a single compute system, independent threads of a single computer program executing on a single compute system). The communication may thus remain internal to the single computer. In most embodiments, however, the systems 1200 and 1500 are logically distinct using distributed processing on at least two computer systems (e.g. on different systems having their own dedicated processor(s)). The communication may thus typically be inter-system.

In exemplary embodiments where the interactive computer simulation involves the centralized computer system 1500 and the computer system 1200 (and possibly additional computer system(s) 1200A . . . G), a simulation network (e.g., overlaid on the network 1300) may be used, at runtime (e.g., using real-time priority processing or processing priority that the user perceives as real-time), to exchange information (e.g., event-related simulation information). For instance, movements of a vehicle associated to the computer system 1200 and events related to interactions of a user the computer system 1200 with the interactive computer generated environment may be shared through the simulation network from the computer system 1200. Likewise, simulation-wide events (e.g., related to persistent modifications to the interactive computer generated environment, modified simulated weather, etc.) may be shared through the simulation network from the centralized computer system 1500. In addition, the storage module 1400 (e.g., a networked database system) accessible to all computer systems involved in the interactive computer simulation may be used to store data necessary for rendering interactive computer generated environment (e.g., data each of the 3D polygon meshes of the interactive computer generated environment, etc.). In some embodiments, the storage module 1400 is only updated from the centralized computer system 1500 and the computer system(s) 1200, 12000A . . . G only load data from the storage module 1400.

In a first set of exemplary embodiments, the present invention aims at improving the manner in which dynamic events are considered during an interactive computer simulation while taking into consideration expected plausibility and usage of the material resources. An example of dynamic events in the interactive computer simulation is an explosion, an impact (e.g., from an inert projectile) or an explosive impact (e.g., from a rocket or a missile) at a given location within an interactive computer generated environment of the interactive computer simulation. Such dynamic events may create damage to structures represented in the interactive computer simulation. The damage should be made visible (e.g., rendered on display) at least to the initiating user of the dynamic event. In some embodiments, the damage is made persistent in a centralized simulation engine of the interactive computer simulation and may also be made visible to other parties of the interactive computer simulation (if any), decentralized from the centralized simulation engine. In the first set of exemplary embodiments, the present invention is meant to simplify the computation required to represent a virtual impact on a structure during the interactive computer simulation so that the virtual impact may be plausibly represented without perceived diminished quality by the user of the interactive computer simulation. For instance, in the first set of exemplary embodiments, the present invention supports rendering of aesthetically attractive images that are not realistic (as the laws of physics that would be involved in a real impact are not fully considered), but at least plausibly representing damages that may be caused by the virtual impact. Of course, skilled person will readily understand that the rendered images being aesthetical and attractive is subjective and depends on the quality of artistic work performed to create the necessary visual texture(s). The present invention, while it supports appropriate rendering of the visual texture, is not meant to improve poor artistic work.

In a second set of exemplary embodiments, the present invention aims at improving the manner in which 3D polygon meshes are represented during an interactive computer simulation while taking into consideration expected plausibility and usage of the material resources. For instance, one or more 3D polygon meshes may present an unrealistic shape (e.g., disconnected part or unbalanced shape that should collapse, etc.). Based on a logical representation (e.g., connectivity graph) of the polygon mesh built considering an anchor point (e.g., connection of the 3D mesh in its environment such as the simulated ground), some rendering faces of the polygon mesh are removed (e.g., disappear or collapse from the perspective of the user). For instance, disconnected part may be identified as being disconnected from the anchored portion of the polygon mesh while unbalanced shape may be identified based on the center of mass and a located short link between the unbalanced shape and the rest of the polygon mesh. The disappearance and/or collapsing may be performed upon loading the polygon mesh(es), e.g., to ensure that the interactive simulation shows credible structure to start with. The disappearance and/or collapsing may also be performed in conjunction with dynamic events in the interactive computer simulation (e.g., as previously described in the first set of embodiments). The unrealistic shape may disappear from the interactive simulation or may be transformed into debris (e.g., smoke or other effect covering disappearance, animation from the shape to debris, animation of a falling structure and/or, instant transformation of the shape into debris (e.g., covered by smoke or other effect), etc.)

In a third set of embodiments, the present invention aims at improving the manner in which dynamic events are shared during an interactive computer simulation between at least two interactive computer simulation stations and a centralized processing unit (e.g., central simulation engine unit). A dynamic event on a polygon mesh is treated by a first interactive computer simulation station into one or more newly formed 3D polygon meshes. The same dynamic event on the same polygon mesh is also treated by a centralized processing unit independently from the first interactive computer simulation station (e.g., in parallel and/or in non-real-time processing) into the newly formed 3D polygon mesh(es). The non-real-time processing by the centralized processing unit may involve exactly the same mathematical operation(s) as treatment by the first interactive computer simulation system, but may also involve at least one more complex operation leading to even more realistic newly formed 3D polygon mesh(es). The centralized processing unit then persistently updates the newly formed 3D polygon mesh(es) into the storage module 1400 accessible to all involved decentralized interactive simulation stations. In some embodiments, when a second dynamic event occurs on the polygon mesh and/or newly formed 3D polygon mesh(es) (e.g., from the second interactive computer simulation station), the centralized processing unit may use versioning of individual files representing the different involved polygon meshes to ensure proper completion of the operations (e.g., using transaction marker files).

Skilled persons will readily understand that a partial or complete set of features from the first, the second and the third set of embodiments may be implemented together.

For instance, in some embodiments, once a dynamic event is treated and the damage-enhanced images are rendered, the ensuing 3D polygon meshes are persistently stored from a centralized unit or simulation engine and the different interactive simulation station (or training devices) may then plausibly interact with the ensuing 3D polygon meshes. For example, a damaged fence shall have some or all of its geometry removed to allow a tank to pass through.

While it is an objective for the damage-enhanced images to be rendered at least at runtime (e.g., using real-time priority processing, i.e., as seamlessly as possible or seen as quasi-instantaneous from the perspective of the user), in some embodiments, additional special effects may be used during a certain time at least until the damage-enhanced images are rendered (e.g., animated explosion and dust). The special effects shall be provided with low latency (e.g., in the order of a few hundred milliseconds) to make the effect plausible.

In the context of the present invention, runtime execution or real-time priority processing execution corresponds to operations executed during the interactive computer simulation that may have an impact on the perceived quality of the interactive computer simulation from a user perspective. An operation performed at runtime or using real-time priority processing thus typically needs to meet certain performance constraints that may be expressed, for instance, in terms of maximum time, maximum number of frames, and/or maximum number of processing cycles. For instance, in an interactive simulation having a frame rate of 60 frames per second, it is expected that a modification performed within 5 to 10 frames will appear seamless to the user. Skilled persons will readily recognize that real-time processing may not actually be achievable in absolutely all circumstances in which rendering images is required. The real-time priority processing required for the purpose of the present invention relates to perceived quality of service by the user of the interactive computer simulation, and does not require absolute real-time processing of all dynamic events, even if the user was to perceive a certain level of deterioration of quality of service that would still be considered plausible.

In some embodiments, it is possible to undo the damages related to one or more dynamic events.

The interactive computer simulation may, for instance, be used for training purposes and/or for enacting a scenario from historical data (e.g. from an event recording device (e.g., black box) from an aircraft, a train, etc.). The interactive computer simulation may be scenario-based (e.g., where simulation code driving the interactive computer generated environment comprises one or more predetermined events, motions, sounds, etc.).

The interactive computer simulation may be a vehicle interactive computer simulation (e.g., single or multiple vehicles simultaneously) and a field of view for rendering the image(s) may be defined from a user's position within an interactive simulated vehicle (e.g., different fields of view for different interactive simulated vehicles). The present invention is not limited by the type of interactive simulated vehicle, which may be terrestrial (car, tank, etc.), underground, airborne (e.g., an aircraft, a space shuttle), floating (e.g., a boat), etc. The field of view, or point of view, may be defined from the position of a trainee of the interactive simulated vehicle (e.g., interacting with the simulation) and/or the position of an operator of the interactive simulated vehicle (e.g., only determining content of the simulation code or participating to the interactive simulation as well).

The interactive computer generated environment comprises at least one three dimensional (3D) polygon mesh. Typically, a plurality of 3D polygon meshes are presented in the interactive computer generated environment. Interactions are expected in the interactive computer simulation between the polygon mesh(es) and the simulated vehicle(s) as well as between the polygon mesh(es) and dynamic events, e.g., triggering damages thereto. The dynamic events are typically initiated from the user(s) of the interactive computer simulation.

Figure 2:
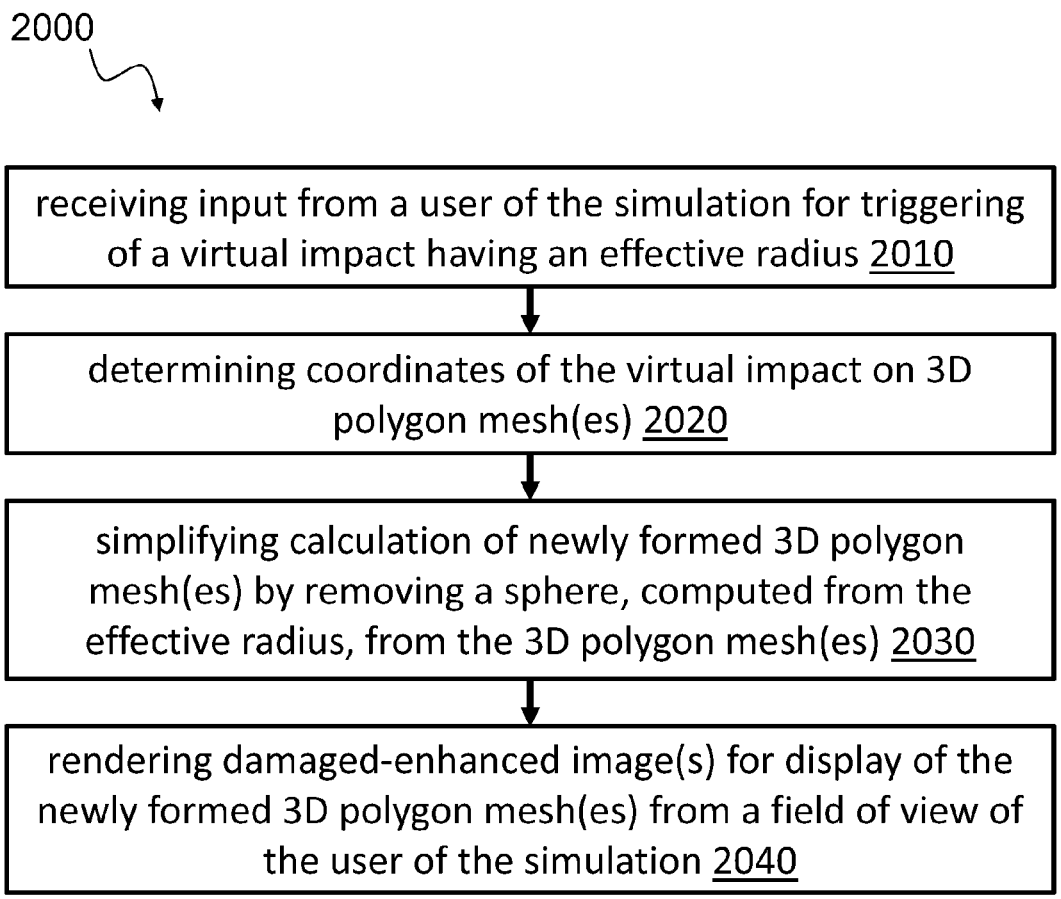
FIG. 2 is a flow chart of a first exemplary rendering method in accordance with a first set of embodiments of the present invention.

FIG. 2 illustrates an exemplary method 2000 for rendering damaged-enhanced images in the interactive computer simulation in accordance with a first set of embodiments. The interactive computer simulation comprises an interactive computer generated environment. The method 2000 may take advantage of constructive solid geometry (CSG) operation(s) to remove a volume from another, modifying 3D polygon meshes in proximity with an impact to be modified by having one or more portions thereof removed from the interactive computer generated environment.

In some embodiment, the method 2000 may comprise, before beginning the interactive computer simulation, identifying one or more opened polygon meshes forming non-watertight meshes (e.g., using the processor module 1230). Identifying the opened polygon mesh(es) may be performed by computing connectivity graphs or other logical representations of the polygon meshes. The method 2000 may also comprise, for each identified opened polygon mesh, attempting to close the corresponding polygon mesh and, if not possible, marking the corresponding polygon mesh as un-damageable.

The method 2000 comprises during the interactive computer simulation, receiving an input 2010 from a user of the interactive computer simulation for triggering a virtual impact having an effective radius. The received input from the user may be received from one or more simulated instruments of the instrument simulation module 1250 (e.g., action of a button or a trigger or a combination of button(s)/trigger(s)). The method 2000 then comprises determining coordinates 2020, in the interactive computer generated environment, of the virtual impact having the effective radius (e.g., using the processor module 1230). The coordinates of the virtual impact are located on at least one 3D polygon mesh of the interactive computer generated environment. The effective radius may be fixed in the interactive computer generated environment or may be determined from the operation(s) performed to trigger the virtual impact (e.g., type of bomb/missile used, etc.) and/or from the at least one 3D polygon mesh of the interactive computer generated environment (simulated material of the 3D polygon mesh(es) being concrete, sand, etc.). However, even if some dynamic details may in some embodiments be taken into consideration for determining the effective radius, the purpose is not to replicate or simulate a realistic impact, but to plausibly provide feedback of the virtual impact, at the coordinates, within a number of processing cycles that appear as real-time for the user of the interactive computer simulation. In some embodiments involving more than one computer system, the virtual impact event may be shared on a simulation network.

As an option, the method 2000 may further comprise, after determining 2020 the coordinates, rendering at least one temporary image for display comprising a distracting visual effect at or near the determined coordinates at least until rendering the at least one damaged-enhanced image is performed (e.g., using the processor module 1230). In some embodiments, the distracting visual effect may actually be disconnected from the coordinates of the virtual impact, but still provide the distracting effect (e.g., rendering 2D images considering the field of view).

In some embodiments, the method 2000 may then follow with identifying, at the coordinates, a first plurality of rendering faces (e.g., triangles) affected by the virtual impact considering the effective radius (e.g., using the processor module 1230). The first plurality of rendering faces is associated with the 3D polygon mesh(es) of the interactive computer generated environment at the coordinates. The method 2000 may also comprise verifying that the at least one 3D polygon mesh are not marked as un-damageable. When the 3D polygon mesh is marked as un-damageable, then the damaged-enhanced rendered images may be limited to the distracting effect discussed previously.

Afterwards, the method 2000 comprises simplifying calculation 2030 of at least one newly formed 3D polygon mesh from the virtual impact at the coordinates. The simplified calculation 2030 is performed by removing a portion of a sphere or spheroid or other simple mathematically-defined shape expressed by a single, linear, mathematical formula), computed from the effective radius, from the at least one 3D polygon mesh of the computer generated environment, thereby defining the at newly formed 3D polygon mesh(es). From the perspective of the user of the interactive computer simulation, the newly formed 3D polygon mesh(es) simulate the effect of the virtual impact, triggered by the received input, at the coordinates.

In some embodiments, removing the portion of a sphere in 2030 is performed by clipping the first plurality of rendering faces to the portion of a sphere (or other mathematically-defined subtraction shape, e.g., using the processor module 1230). The sphere is preferred for the simplified calculation 2030, which is expected to be performed at runtime (or in real-time priority processing) in a number of processing cycles that maintain the required plausibility of the interactive computer simulation from the perspective of the user. However, depending on the expected processing capabilities of the computer system 1200 involved in the interactive computer simulation, more complex mathematically-defined subtraction shapes, which may further include randomness, may be used, e.g., to obtain a more realistic effect. However, even if more complex mathematically-defined subtraction shapes may in some embodiments be used for simulating the virtual impact, the purpose is not to replicate or simulate a realistic impact, but to plausibly provide feedback of the virtual impact, at the coordinates, within a number of processing cycles that appear as real-time for the user of the interactive computer simulation.

Optionally, the method 2000 may further comprise, before clipping, determining that each of the at least one 3D polygon mesh forms a watertight mesh. As another option, the method 2000 may further comprise, after identifying the affected first plurality of rendering triangles, buffering the first plurality of rendering triangles thereby allowing to undo the clipping. Clipping the rendering face(s) may be performed by indicating a null (or minimal) surface for the to-be-removed rendering face(s). Using this technique may simplify the overall procedure by further limiting the complexity of the computation of the newly formed 3D polygon mesh(es).

In some embodiments, the method 2000 may then comprise computing a second plurality of rendering faces from the clipped first plurality of rendering faces (e.g., using the processor module 1230).

The method then comprises rendering 2040 at least one damaged-enhanced image for display of the newly formed 3D polygon mesh(es) from a field of view of the interactive computer simulation (e.g., using the image generator module 1232). In some embodiments, rendering 2040 may be performed by rendering a subset of the second plurality of rendering faces using a visual texture, the subset being determined from the field of view.

Optionally, the method 2000, including the simplified calculation 2030 of the newly formed 3D polygon mesh(es), may be performed in real-time priority processing. The method 2000 may further be performed by a decentralized processing unit associated with an interactive simulated vehicle of the interactive computer generated environment in a limited number of milliseconds. The field of view is defined, in this exemplary embodiment, from a user's position within the interactive simulated vehicle. Still in this exemplary embodiment, the method 2000 may further comprise, at a centralized processing unit, computing the at least one newly formed 3D polygon mesh from the determined coordinates. Computing at the centralized processing unit may be performed independently (and optionally in parallel) from the decentralized processing unit and in non-real-time priority processing. The centralized processing unit may also persistently update or store the at least one newly formed 3D polygon mesh into the storage module 1400.

Computing the at least one newly formed 3D polygon mesh at the centralized processing unit may also optionally be performed using a second mathematically-defined subtraction shape more complex than the mathematically-defined subtraction shape used at the decentralized processing unit.

The interactive computer simulation may optionally involve a second decentralized processing unit associated with a second interactive simulated vehicle of the interactive computer generated environment having a second field of view defined from a second user's position within the second interactive simulated vehicle. The method 2000 may then also further comprise loading, at the second decentralized processing unit of the interactive computer simulation, the at least one newly formed 3D polygon mesh data, computed by the centralized processing unit, from the storage module 1400 (e.g., when the 3D polygon mesh enters the second field of view).

The method 2000 may also further comprise receiving, at the second decentralized processing unit, the coordinates of the virtual impact (e.g., from the simulation network) and computing, at runtime (e.g., in real-time priority processing) and in parallel to the (first) decentralized processing unit, the at least one newly formed 3D polygon mesh. No matter if computed locally or loaded from the storage module 1400, the at least one newly formed 3D polygon mesh is rendered by the second decentralized processing unit similarly to the (first) decentralized processing unit. Skilled persons will understand that a subsequent virtual impact could be initiated from the second decentralized processing unit that may then itself execute the exemplified method 2000.

In some embodiments, the method 2000 may further comprise, after computing the second plurality of rendering faces, testing the at least one newly formed 3D polygon mesh for loops.

Rendering 2040 the damaged-enhanced images may also further comprise applying a damage texture, fading outwardly from the coordinates and exceeding the effective radius, on a subset of the newly formed 3D polygon mesh(es) (e.g., in some embodiments, the second plurality of rendering faces corresponding to surfaces previously represented in at least the first plurality of rendering faces).

Figure 3:
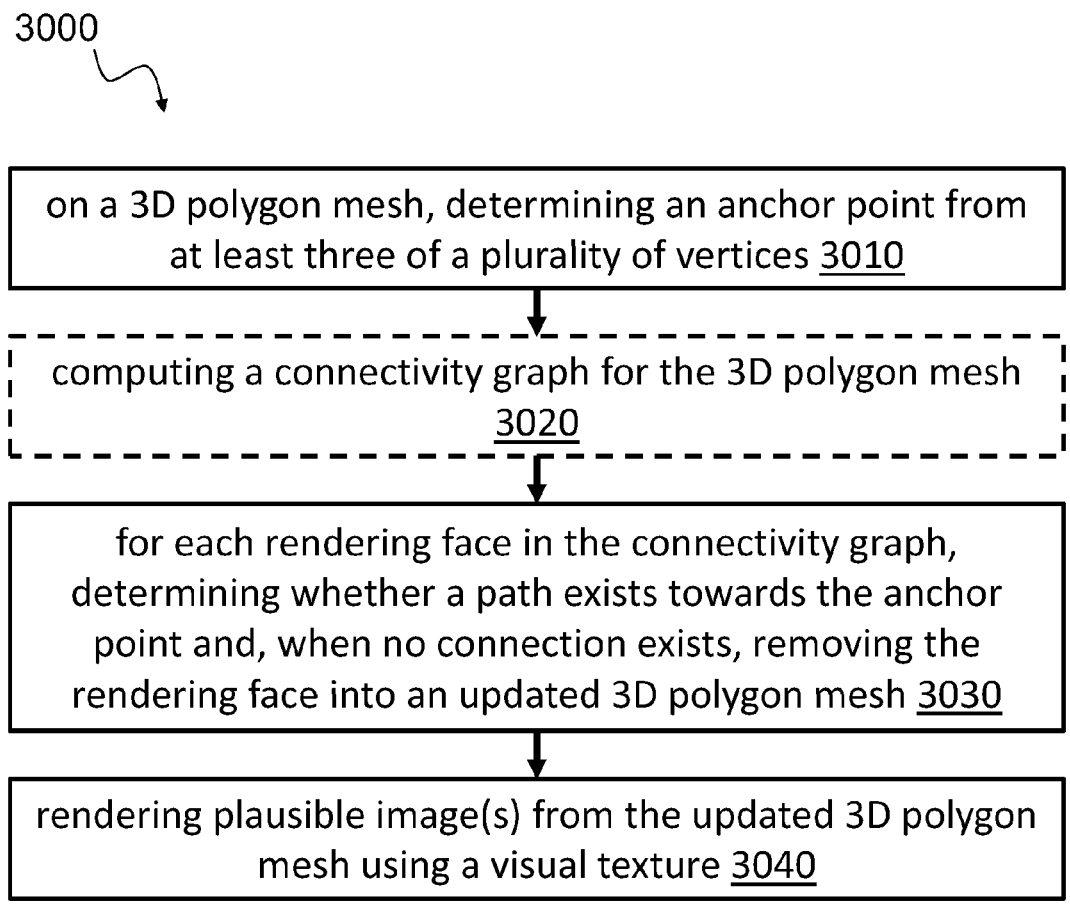
FIG. 3 is a flow chart of a second exemplary rendering method in accordance with a second set of embodiments of the present invention.

FIG. 3 illustrates an exemplary method 3000 for rendering plausible images of a three-dimensional (3D) polygon mesh in an interactive computer simulation in accordance with a second set of embodiments. The interactive computer simulation is expected to have a virtual gravity force effective within its interactive computer generated environment. The memory module 1220 may be used for storing respective representations of a plurality of 3D polygon meshes of the interactive computer simulation. The plurality of 3D polygon meshes to be stored may be determined from at least a field of view of the interactive computer simulation, e.g., so that the determined plurality of 3D polygon are available for processing at runtime.

The 3D polygon meshes may be defined (e.g., in the representations from the memory module 1220) using a plurality of vertices providing a plurality of rendering faces (e.g., triangles). The method 3000 comprises determining 3010 an anchor point from at least three of the plurality of vertices of the 3D polygon mesh (e.g., using the processor module 1230). The anchor point indicates a connection between the 3D polygon mesh and the ground or between the 3D polygon mesh and one or more collocated 3D polygon mesh, ultimately connected to the ground.

For each one of the rendering faces of the 3D polygon mesh, the method 3000 follows with determining 3030 whether a path exists towards the anchor point and, when no connection exists, removing the one rendering face from the 3D polygon mesh into an updated 3D polygon mesh (e.g., using the processor module 1230). Removing the rendering face may be performed by indicating a null (or minimal) surface for the to-be-removed rendering face. Using this technique may simplify the overall procedure by limiting the complexity of the computation of the newly formed 3D polygon mesh(es).

The updated 3D polygon mesh comprising a subset of the plurality of rendering faces is then rendered for display 3040 using a visual texture (e.g., using the image generator module 1232). The subset of rendering faces is determined from the field of view of the interactive computer simulation.

In some embodiments, the method 3000 may also comprise, prior to removing the rendering faces 3030, determining (not shown) whether a direct connection exists from the rendering faces to the ground. When a direct ground connection exists, the rendering faces are closed (see some exemplary embodiments in the first set of embodiments) and one or more newly formed 3D polygon mesh(es) is computed and further rendered.

The method 3000 may comprise computing 3020 a connectivity graph (e.g., as a representation of the 3D polygon mesh) from the plurality of rendering faces representing the 3D polygon mesh (e.g., using the processor module 1230). When the connectivity graph is used as the representation of the 3D polygon mesh, determining that the path does not exist towards the anchor point involves removing the one rendering face from the connectivity graph into an updated connectivity graph representing the updated 3D polygon mesh.

For instance, a decentralized processing unit may be associated with an interactive simulated vehicle of the interactive computer generated environment and the field of view may be defined from a user's position within the interactive simulated vehicle The method 3000 for rendering the plausible images may be performed at runtime (e.g., in real-time priority processing) by the decentralized processing unit in a limited number of milliseconds (e.g., using the processor module 1230).

The method 3000 may also comprise replacing, at runtime (e.g., in real-time priority processing), the impacted rendering face(s) in the connectivity graph with a plurality of new rendering faces. The replacement may be performed before determining whether the path exists towards the anchor point and following a virtual impact on the 3D polygon mesh affecting at least one impacted rendering face from the plurality of rendering faces (see first set of embodiments).

Before rendering the 3D polygon mesh, the method 3000 may also comprise, at runtime (e.g., in real-time priority processing), determining a center of mass of a part the 3D polygon mesh from the plurality of vertices associated with the part and determining that the part of the 3D polygon mesh is unstable (or unbalanced) from the perspective of the anchor point considering the virtual gravity force applied in the interactive simulation. Then, a subset of unstable rendering faces from the plurality of rendering faces may be identified on the unstable part and the unstable rendering faces may then be removed from the connectivity graph into the updated 3D polygon mesh.

Figure 4:
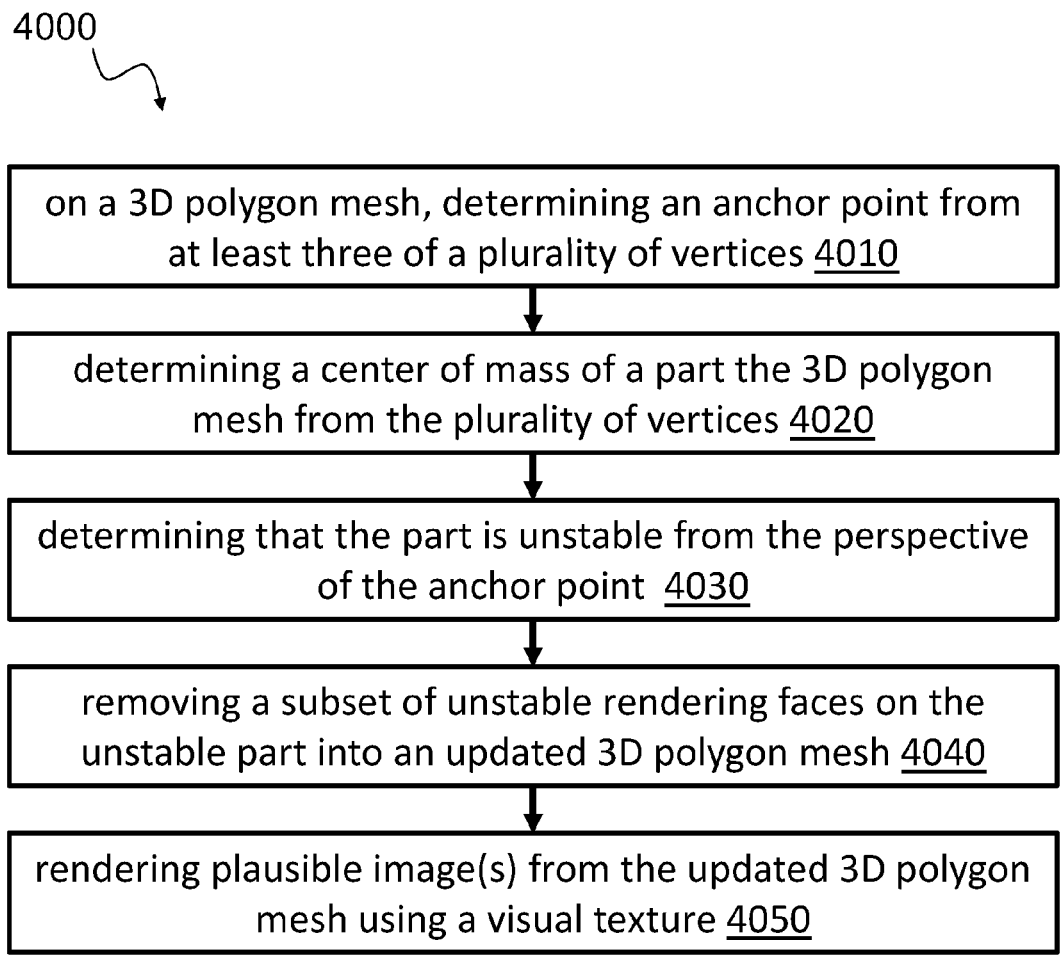
FIG. 4 is a flow chart of a third exemplary rendering method in accordance with the second set of embodiments of the present invention.

FIG. 4 illustrates another exemplary method 4000 for rendering plausible images of a three-dimensional (3D) polygon mesh in an interactive computer simulation in accordance with the second set of embodiments. The interactive computer simulation is expected to have a virtual gravity force effective within its interactive computer generated environment. The memory module 1220 may be used for storing respective representations of a plurality of 3D polygon meshes of the interactive computer simulation. The plurality of 3D polygon meshes to be stored may be determined from at least a field of view of the interactive computer simulation, e.g., so that the determined plurality of 3D polygon are available for processing at runtime.

The 3D polygon meshes may be defined (e.g., in the representations from the memory module 1220) using a plurality of vertices providing a plurality of rendering faces (e.g., triangles). The method 4000 comprises determining 4010 an anchor point from at least three of the plurality of vertices of the 3D polygon mesh (e.g., using the processor module 1230). The anchor point indicates a connection between the 3D polygon mesh and the ground or between the 3D polygon mesh and one or more collocated 3D polygon mesh, ultimately connected to the ground. (e.g., using the processor module 1230)

The method 4000 then follows, at runtime (e.g., in real-time priority processing), with determining 4020 a center of mass of a part the 3D polygon mesh from the plurality of vertices associated with the part (e.g., using the processor module 1230) and determining 4030 still at runtime that the part of the 3D polygon mesh is unstable from the perspective of the anchor point considering the virtual gravity force applied in the interactive simulation. A subset of unstable rendering faces from the plurality of rendering faces on the unstable part may then be removed 4040 into an updated 3D polygon mesh. Thereafter, e.g., using the image generator module 1232, the method 4000 follows with rendering 4050 the updated 3D polygon mesh for display comprising a subset of the plurality of rendering faces using a visual texture, the subset being determined from a field of view of the interactive computer simulation.

Whether in the context of the method 3000 or the method 4000, new rendering faces may also be appended (e.g., to a connectivity graph) to close the updated 3D polygon mesh.

The 3D polygon mesh may have different attributed associated therewith such as a virtual tensile strength and a virtual density value. When removing the unstable rendering faces 4040, the virtual tensile strength and virtual density value may be used to compute a virtual collapsing pressure for a fulcrum area of the unstable part compared to the center of mass. The removal could take place only when the virtual collapsing pressure exceeds the virtual tensile strength.

Determining that the part is unstable 4030 may optionally be performed by locating a narrow link surrounding the virtual impact on the 3D polygon mesh. The narrow link may define a fulcrum area between the part and another part of the 3D polygon mesh connected to the anchor point. It may this be determined that the part is unstable 4030 when the structure above the narrow link is not connected to the anchor point and the center of mass is not above the fulcrum area. Locating the narrow link in the 3D polygon mesh may be performed by identifying, surrounding a virtual impact, a lowest isolated vertex from the plurality vertices and, until the narrow link is located or until a performance-based threshold is attained for maintaining perceived plausibility for the user of the interactive computer simulation (e.g., time limit, number of frame(s) limit, number of processing cycles, etc.), determining the narrow link as the minimum fulcrum area between the part and the other part connected to the anchor point starting from a horizontal plane at the lowest isolated vertex and considering the closest neighbor vertices thereof.

The method 3000 and/or the method 4000 of removing the relevant rendering face from the updated 3D polygon mesh (e.g., from the corresponding connectivity graph) may also be performed at a centralized processing unit independently from the decentralized processing unit and in non-real-time priority processing, e.g., using the same or a more complex procedure. Relevant data may then be stored on the storage module 1400 so that decentralized processing unit(s) are able to load the relevant data (e.g., when the updated 3D polygon mesh enters or reenters their respective field of view).

Figure 5:
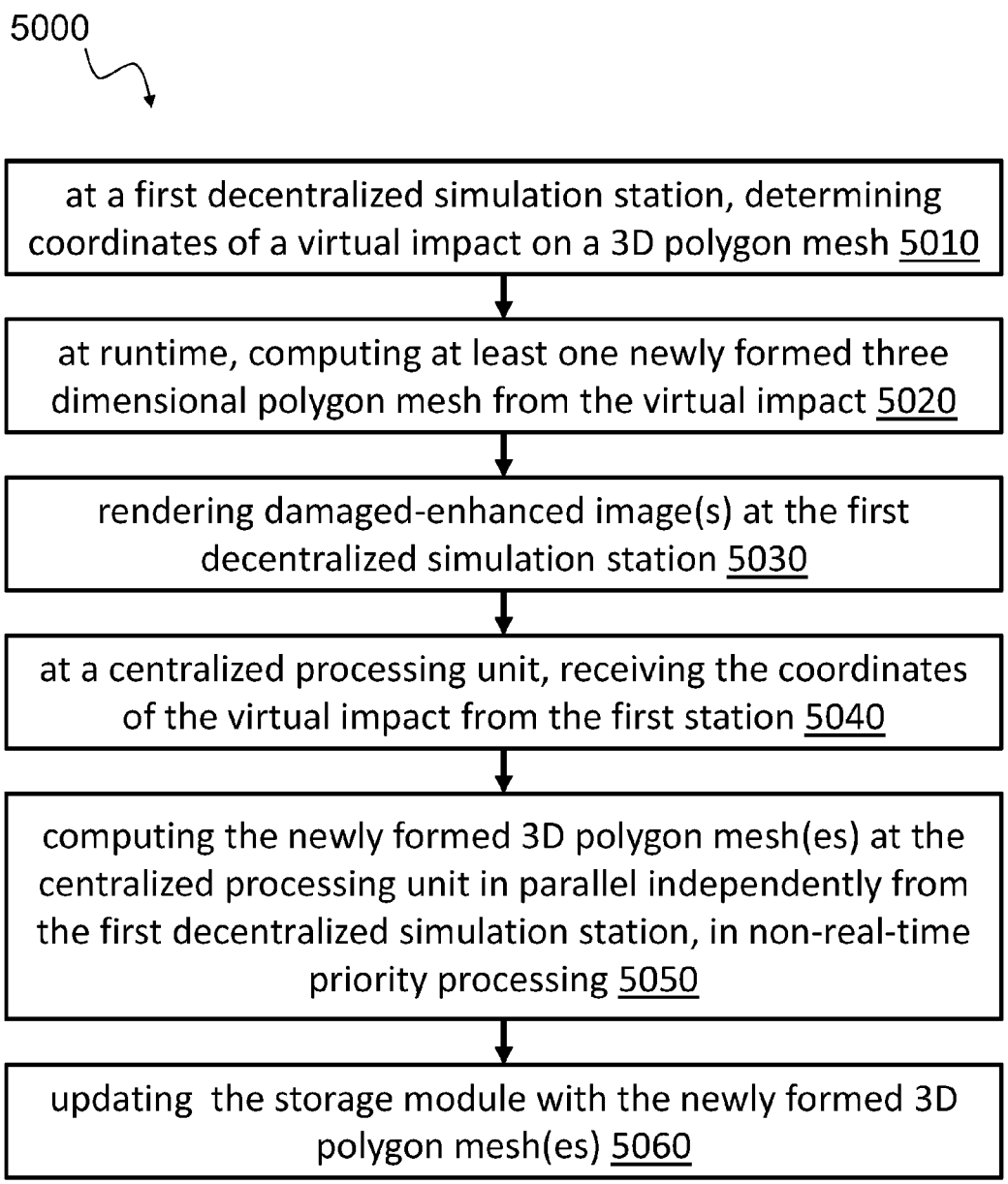
FIG. 5 is a flow chart of an exemplary data updating method in accordance with a third set of embodiments of the present invention.

FIG. 5 illustrates an exemplary method 5000 for updating damaged-enhanced images in the interactive computer simulation in accordance with a third set of embodiments. The interactive computer simulation comprises an interactive computer generated environment. The interactive computer simulation is associated to a storage module 1400 accessible to at least a first decentralized interactive simulation station, a second decentralized interactive simulation station (e.g., where a user interacts with the interactive simulation) and a centralized processing unit thereof (e.g., a simulation engine). The method 5000 comprises, at the first decentralized interactive simulation station, during the interactive computer simulation, determining 5010 coordinates of a virtual impact on a three dimensional (3D) polygon mesh of the interactive computer generated environment and, at runtime (e.g., in real-time priority processing), computing 5020 at least one newly formed 3D polygon mesh from the virtual impact without updating the storage module 1400. Then, at least one damaged-enhanced image of the at least one newly formed 3D polygon mesh is rendered 5030 for display from a field of view of the first decentralized interactive simulation station. The method 5000 also comprises, at the centralized processing unit, receiving 5040 the coordinates of the virtual impact from the first decentralized interactive simulation station and, at the second decentralized interactive simulation station, receiving the coordinates of the virtual impact. The centralized processing unit then computes 5050, independently and in non-real-time priority processing, the newly formed 3D polygon mesh(es) from the determined coordinates and persistently updates the storage module 1400 associated to the interactive simulation with the at least one newly formed 3D polygon mesh.

The first decentralized interactive simulation station may be associated to a first interactive simulated vehicle of the interactive computer generated environment. The first field of view of the first decentralized interactive simulation station may then be defined from a user's position within the first interactive simulated vehicle. Likewise, the second decentralized interactive simulation station may be associated to a second interactive simulated vehicle of the interactive computer generated environment. A second field of view of the second decentralized interactive simulation station may then be defined from a user's position within the second interactive simulated vehicle.

Upon receiving the coordinates of the virtual impact at the second decentralized interactive simulation station, the second decentralized interactive simulation station may compute the at least one newly formed 3D polygon mesh from the received coordinates, at runtime (e.g., in real-time priority processing), in parallel and independently from the first decentralized interactive simulation station.

The second decentralized interactive simulation station of the interactive computer simulation may alternatively load the at least one newly formed 3D polygon mesh from the storage module 1400 when the at least one newly formed 3D polygon mesh enters the second field of view of the second decentralized interactive simulation station.

Computing 5050 the at least one newly formed 3D polygon mesh at the centralized processing unit may, in addition, be performed in parallel using a more complex mathematical operation compared to computing 5020 of the first decentralized interactive simulation station. The first decentralized interactive simulation station may also load (or reload) the at least one newly formed 3D polygon mesh from the storage module 1400 when the at least one newly formed 3D polygon mesh reenters the first field of view.

The method 5000 may further involve updating 5060 by storing at least one new file in a file system of the storage module 1400 corresponding to the at least one newly formed 3D polygon mesh and storing at least one event in a database of the storage module 1400 corresponding completion of the computation of the at least one newly formed 3D polygon mesh.

The centralized processing unit may comprise a storage module 1400 implementing a file system and computing 5050 at the centralized processing unit may further comprises locating a latest version of a content file in the file system that corresponds to the 3D polygon mesh and verifying if at least one transaction marker file associated with the content file exists. The transaction marker file(s) indicating if the content file is currently subject to an ongoing transaction. When the content file is not currently subject to an ongoing transaction, then the computing 5050 may be performed by copying the content file into a new content file on the file system, updating the new content file with the newly formed 3D polygon mesh(es), and updating the transaction marker file(s). A name of the new content file reflects a newer version compared to the latest version. When the content file is currently subject to an ongoing transaction, the method 5000 may further comprise waiting until the at least one transaction marker file indicates completion of the ongoing transaction before creating a new start transaction marker file and updating the new content file with the newly formed 3D polygon mesh(es). A name of the new start transaction marker file may reflect a newer version compared to the name of the content file following the ongoing transaction and the name of the new content file may reflect the same version as the start transaction file. The method 5000 then follows with creating a new end transaction marker file, a name of the end transaction marker file reflecting the same version as the start transaction marker file.

The centralized processing unit comprises a storage module 1400 implementing a file system and the method further comprises, after receiving 5040 the coordinates of the virtual impact from the first decentralized interactive simulation station and before updating 5060 from the centralized processing unit, receiving coordinates of a second virtual impact on the 3D polygon mesh from the second decentralized interactive simulation station at the centralized processing unit. The method 5000 may then further comprise locating a latest version of a content file in the file system that corresponds to the 3D polygon mesh and creating a first start transaction marker file with a name that reflects a first new version compared to the latest version as well as creating a first new content file with the newly formed 3D polygon mesh(es) computed from the virtual impact. The name of the first new content file reflects the first new version. A first end transaction marker file is then created with a name that reflects the same version as the first start transaction marker file. In this example, the method 5000 then follows with creating a second start transaction marker file with a name that reflects a second new version compared to the first new version, creating a second new content file with the newly formed 3D polygon mesh(es) computed from the second virtual impact. The name of the second new content file reflects the second new version. A second end transaction marker file with a name reflecting the same version as the second start transaction marker file is then created before the centralized processing unit propagates 5060 the newly formed 3D polygon mesh(es) after the creation of the second end transaction marker file to at least the first decentralized interactive simulation station and the second decentralized interactive simulation station.

The exemplary method 2000 may be illustrated, in one embodiment, with regards to the example of FIG. 6. FIGS. 6A to 6E show exemplary visual representations of the exemplary rendering method in accordance with a first set of embodiments of the present invention. On FIG. 6A, an exemplary 3D polygon mesh 6000 is depicted using rendering faces A to T with faces U and V implicitly present opposite respectively faces M and N. For the sake of clarity, the polygon mesh 6000 as depicted does not show faces behind B/C and S/Q. In the example of FIG. 6, the rendering faces are triangles. A logical representation in the format of a connectivity graph 6100 or connectivity tree can be built from the exemplary polygon mesh 6000, as shown in FIG. 6B. Of course, skilled persons will recognize that a typical interactive simulation would involve a plurality of 3D polygon meshes and that the polygon mesh 6000 is chosen to illustrate the teachings of the invention.

The connectivity graph 6100 may be computed at runtime (e.g., in real-time priority processing), while the interactive simulation is ongoing (e.g., as new polygon meshes enter the field of view during the interactive simulation), but computing may advantageously be performed during a pre-processing phase, together with the computing of other connectivity graphs for any polygon mesh that could be affected by the present invention. The pre-processing phase may also be used to generate hollow geometry of the 3D polygon meshes as well as detecting floating parts. The connectivity graph may be stored in the storage module 1400 that may be local (e.g., 1400A collocated with the processor module 1230 rendering the images) or remote 1400B.

During the connectivity graph computing, the polygon mesh 6000 may be analyzed to determine if it forms a fully closed polygon mesh (also referred to as a watertight mesh). In the example of FIG. 6, the floor (e.g., bottom section connected to D, F, G, V, I, N, O) is absent. While polygon meshes without floors are typically useful to avoid rendering a number of non-visible rendering faces required to illustrate a given 3D polygon mesh (e.g., to save triangles), the simplified calculation 2030 is meant to be done on a watertight mesh. It is possible to add some geometry to close the polygon mesh 6000 (e.g., adding rendering faces, which are not meant to be visible, to existing polygon meshes). The addition of rendering faces, if ever required, is to be performed before the simplified calculation 2030. While the addition may be performed at runtime (e.g., in real-time priority processing), the addition may take too much processing time to fit within a maximum time (or number of processing cycles) allowed to maintain expected visual quality of the interactive simulation for at least plausibly representing damages. Therefore, it may be advantageous to add the rendering faces when the polygon mesh 6000 is loaded or in a database storing the polygon mesh 6000 (e.g., in a model of the interactive simulation) prior to loading the polygon mesh 6000.

By adding closing geometry, most of the polygon meshes (or 3D shapes) in the interactive simulation become watertight. However, there may be exceptions for which various procedures may be performed to make them watertight. More specifically, some meshes have 2D parts snapped to them, such as balcony ramps, fences, vegetation foliage, etc. Those can be isolated and only be clipped by the virtual impact. As they represent 2D content there is no need to generate any hollow geometry to connect their clipped surfaces.

Figure 6A:
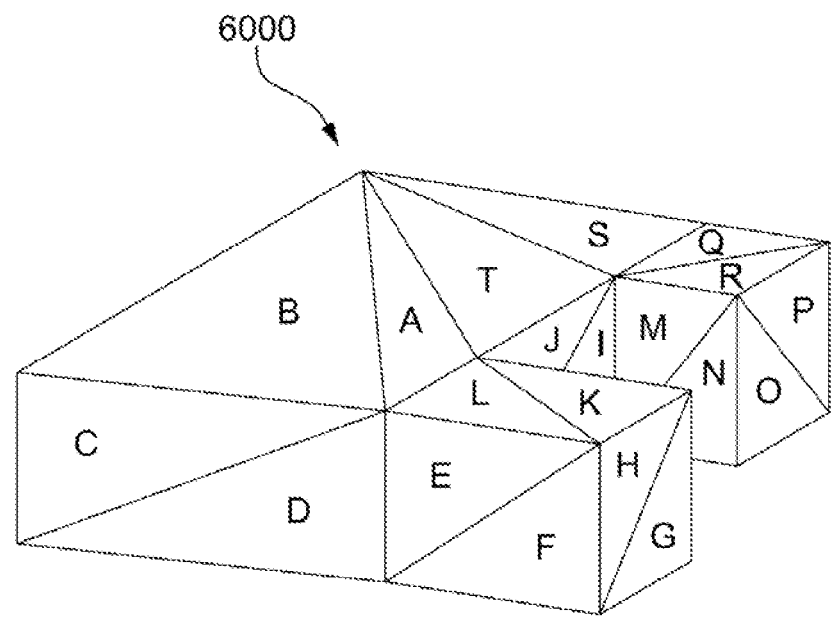
FIGS. 6A, 6B, 6C, 6D and 6E, hereinafter referred to together as FIG. 6, are exemplary visual and logical representations of the exemplary rendering method in accordance with a first set of embodiments of the present invention.
Figure 6B:
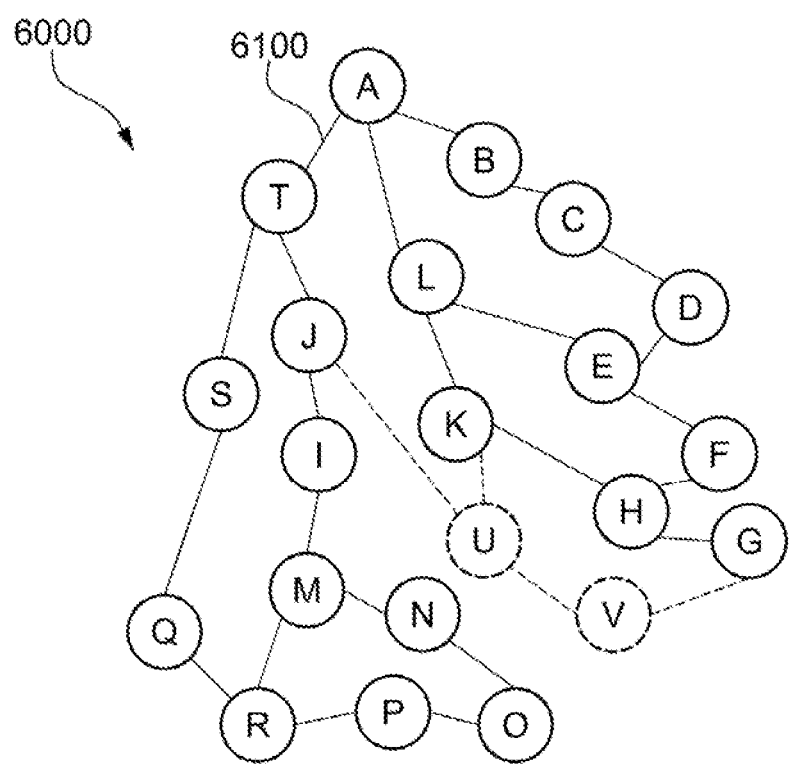
Figure 6C:
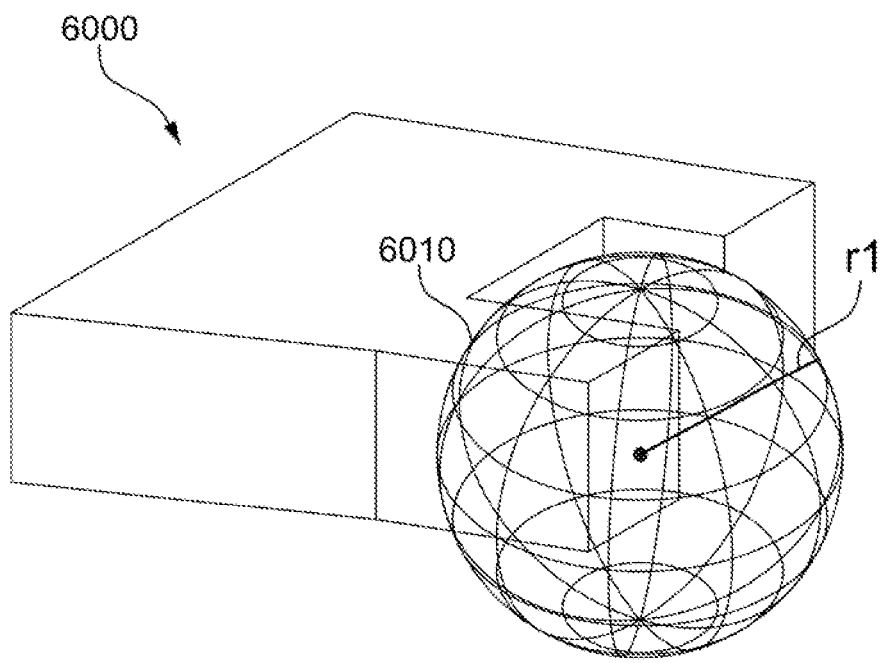
Figure 6D:
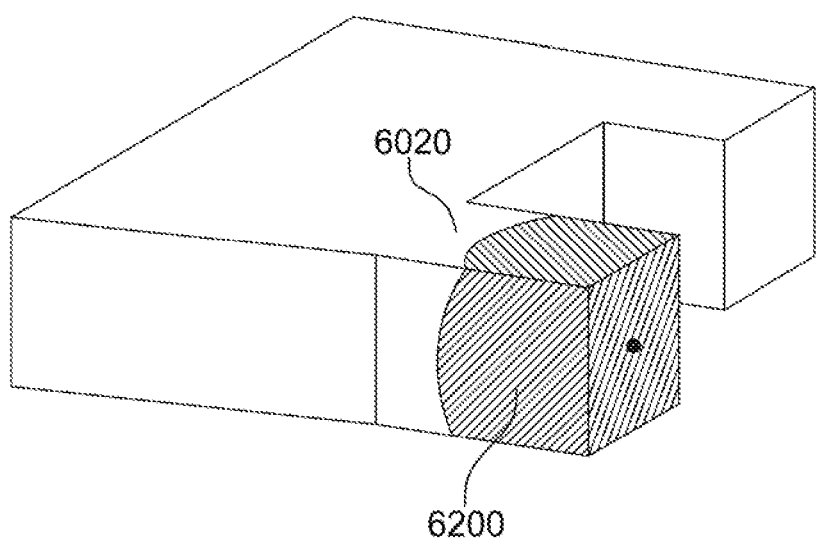

FIG. 6C shows a virtual impact 6010 having coordinates on the face defined by rendering faces G and H having an effective radius r1 (2010). The virtual damage 6010, in the present example is a mathematically defined subtraction shape defined as a sphere having the effective radius r1. The connectivity graph 6100 may be used to identify rendering faces (triangles in the example of FIG. 6) affected by the impact 6010. In the example of FIG. 6, triangles E, F, G, H, K, L, U and V are affected by the impact 6010. For the sake of clarity, U and V will be further discussed in the following discussion, but it is understood that they are also similarly affected. In a first time, the affected triangles may be removed from the connectivity tree (e.g., actually removed or their surface may be collapsed to a null or minimal value). In some embodiments, the removed rendering faces may be kept (e.g., original connectivity graph or portion thereof stored separately in memory) in order to be able to undo the damage 6010.

Figure 6E:
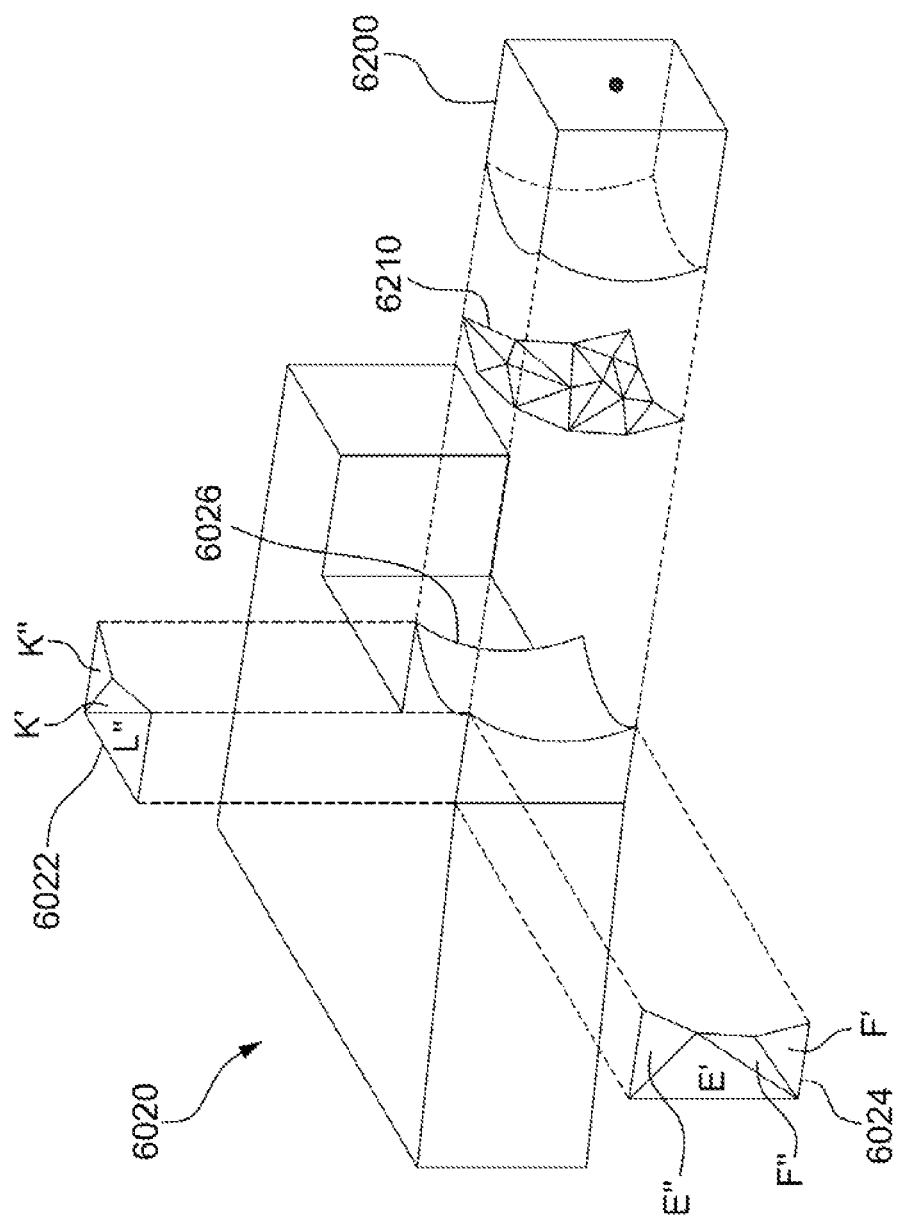

The affected rendering faces are thereafter clipped against the portion of a sphere defined by r1. The clipping is followed by computing of the new rendering faces defining two new polygon meshes 6020 and 6200 from the polygon mesh 6000, as depicted on FIG. 6D. For the sake of illustration, FIG. 6E shows the polygon mesh 6200 detached from the polygon mesh 6020. The new rendering faces may be appended to the connectivity graph. The new rendering faces may also be marked differently (e.g., timestamp and/or specific indication) in the connectivity graph (e.g., to be able to locate them more quickly for a subsequent application of a specific damage mask/texture, to undo the procedure, etc.).

With reference to the example of FIG. 6, the simplified calculation 2030 comprises clipping the triangles and computing the new 3D polygon meshes 6020 and 6200, which may be performed by creating linear segments matching a circle arc from the intersection of the portion of a sphere defined by r1 and the polygon mesh 6000. The linear segments may then be connected to form the new triangles and verification may be performed to locate closed paths (loops). Once the new triangles have been clipped by the volume, any remaining 3D holes that might have been generated are closed by clipping the volume itself with all the closed paths formed by the curved cut-outs into the new triangles. Identifying closed path can be done by considering edges shared by neighbor triangles. Starting from an initial triangle clip path, existence of a neighbor is verified and if it exists, there must necessarily be a path with a common intersection point. The procedure is repeated until the initial triangle is reached or there is a missing neighbor. If the initial triangle is reached, a closed path as been found. This has the exemplary advantage of allowing the procedure to be performed with existing content that was not designed to be damaged.

It may be helpful to distinguish the winding of closed paths. This is required when the impact crosses both front-faced and back-faced polygon meshes, which happens when it affects the whole width of the object or for buildings with modeled interiors. The winding of the closed path is defined by the winding of the triangles it intersects, relative to a ray passing from a fixed point in the interior of the impact through the center of the path. Clockwise winding paths clip all what is outside of them and counter-clockwise winding paths clip all what is inside of them. The orientation of the linear segments may be important depending on the triangle winding (it may be kept at the time of creation). What remains is the impact interior that must be displayed to hide the non-modeled building interior.

Each closed path is tessellated with additional vertices added into the region delimited by the closed paths to smooth the curves. All this geometry can be grouped for all the damages because its texture content does not depend on the impacted geometry. The triangles obtained may be mapped with a procedural texture that may further be independent of the impact type. In order to tessellate the closed paths, once the mesh is generated, it is snapped to the clipped watertight mesh as to generate a new watertight mesh that can be further damaged, if needed.

The exemplary method 3000 may be illustrated, in one embodiment, with regards to the example of FIG. 7. FIG. 6B and FIGS. 7A to 7E show exemplary visual representations of the exemplary method 3000 in accordance with the second set of embodiments of the present invention. On FIG. 7A, an exemplary 3D polygon mesh 7000 is depicted using rendering faces A to T with faces U and V implicitly present opposite respectively faces M and N. For the sake of clarity, the polygon mesh 7000 as depicted does not show faces behind B/C and S/Q. In the example of FIG. 7, the rendering faces are triangles. The polygon mesh 7000 as depicted is subject to an intuitive top-down gravitational force. Of course, different interactive simulations (or interactive simulation environments within a single interactive simulation) may have different rules, including variable gravitational force (e.g., in more game-related environment). In the example of FIG. 7, anchor point may be determined 3010 as a connection to another polygon mesh (not shown) behind B/C, the polygon mesh 7000 being suspended therefrom.

The logical representation of FIG. 6B in the format of the connectivity graph 6100 or connectivity tree from the exemplary polygon mesh 7000 also initially applies to the exemplary polygon mesh 7000. The connectivity graph may be computes (3020) from the plurality of rendering faces at runtime and/or at load time. As previously mentioned, skilled persons will recognize that a typical interactive simulation would involve a plurality of 3D polygon meshes and that the polygon mesh 7000 is chosen to illustrate the teachings of the invention.

Figure 7A:
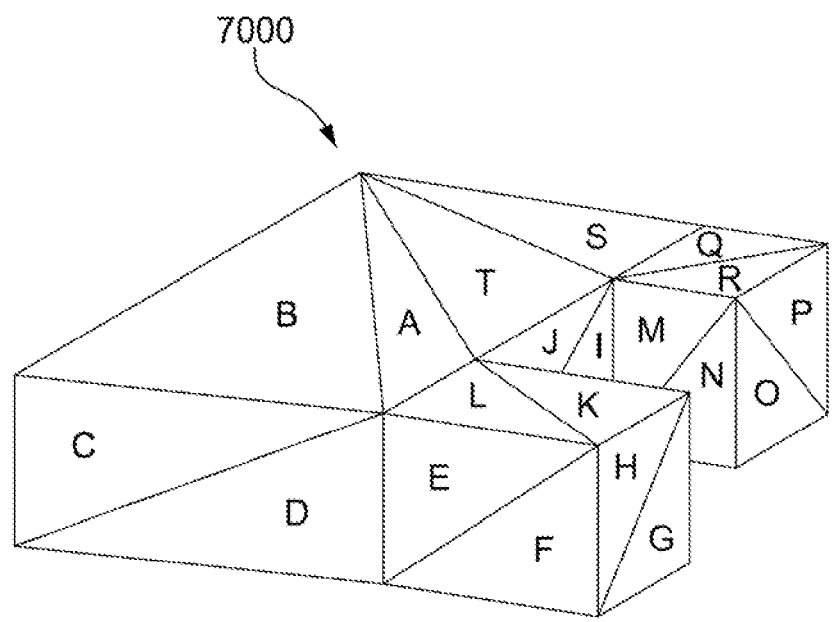
FIGS. 7A, 7B, 7C, 7D and 7E, hereinafter referred to together as FIG. 7, are exemplary visual representations of the exemplary rendering method in accordance with a second set of embodiments of the present invention.
Figure 7B:
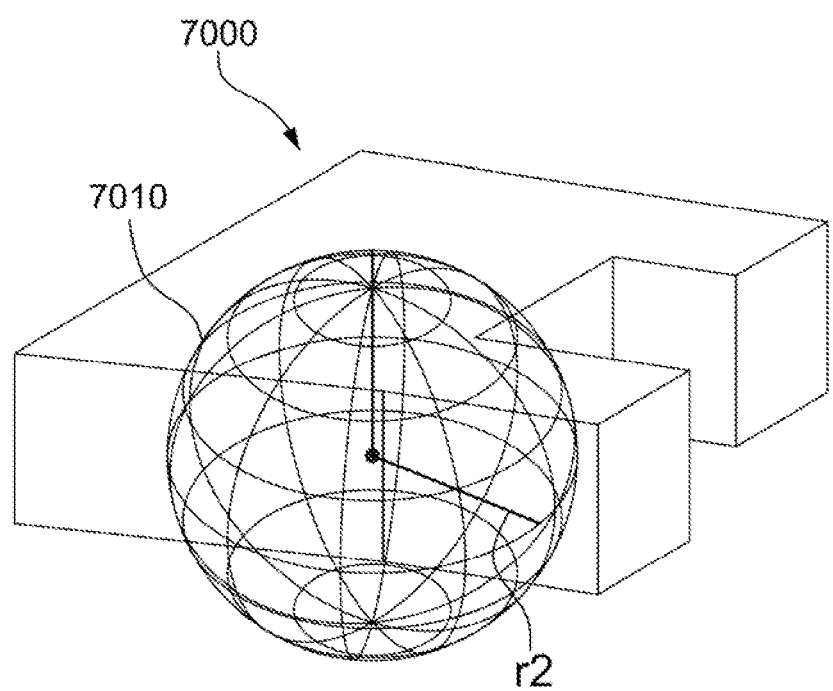
Figure 7C:
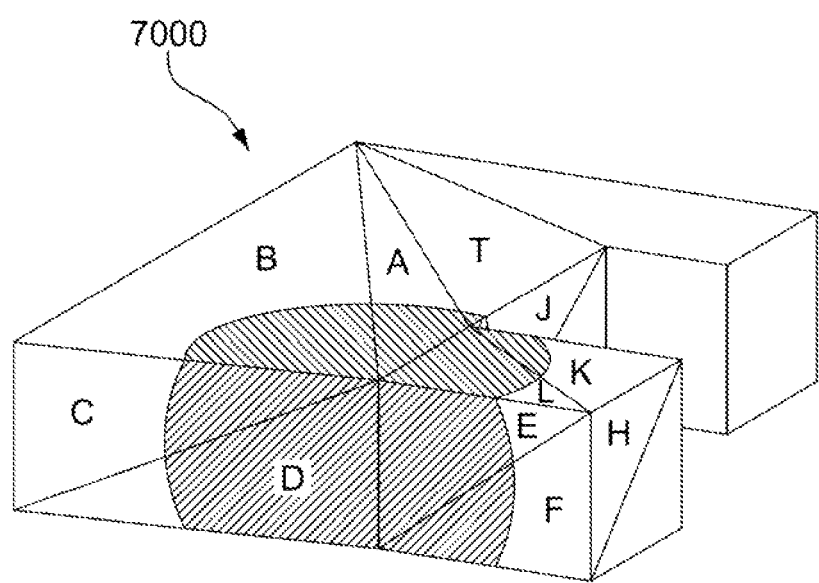

FIG. 7B shows a virtual impact 7010 having coordinates on the rendering face A having an effective radius r2 (2020). The virtual damage 7010, in the present example is a mathematically defined subtraction shape defined as a sphere having the effective radius r2. The connectivity graph 6100 may be used to identify rendering faces (triangles in the example of FIG. 7) affected by the impact 7010. On FIG. 7C, only the triangles directly by the impact 7010 are depicted (i.e., A, B, C, D, E, F, H, J, K, L and T).

Figure 7D:
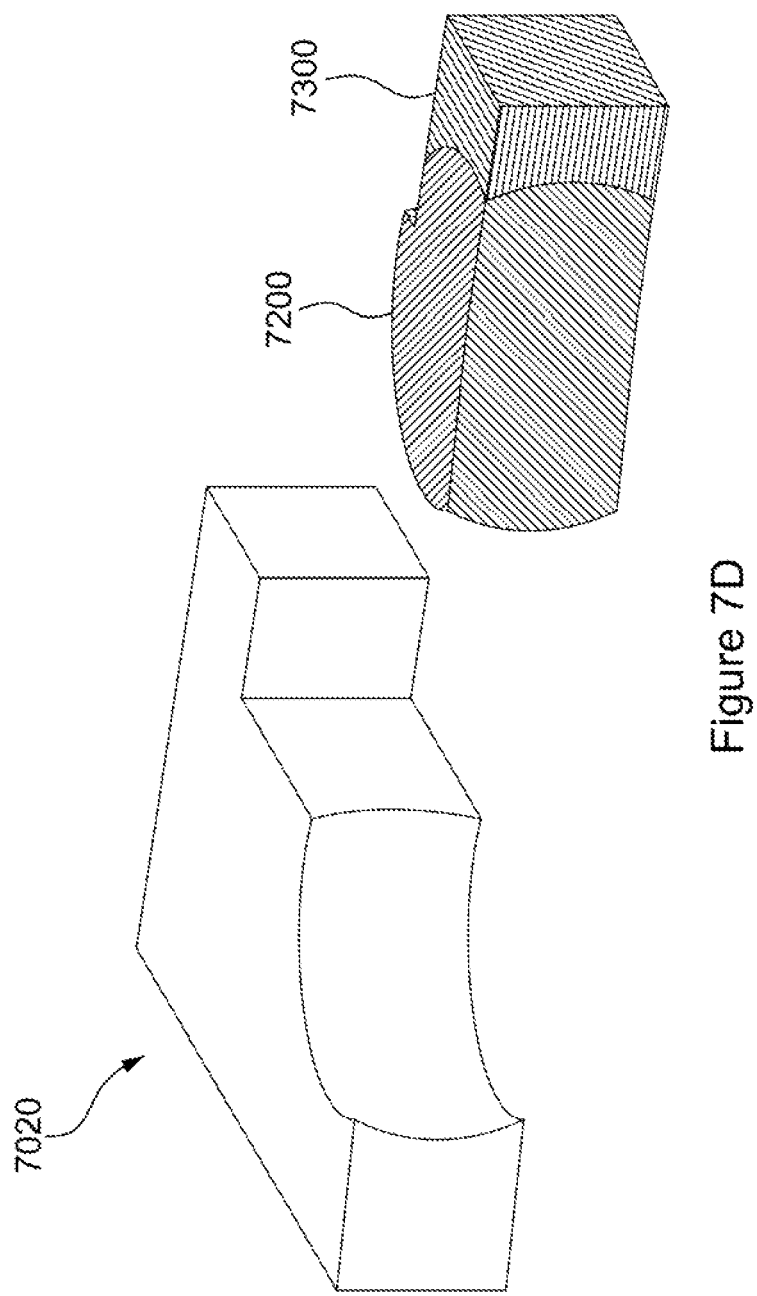
Figure 7E:
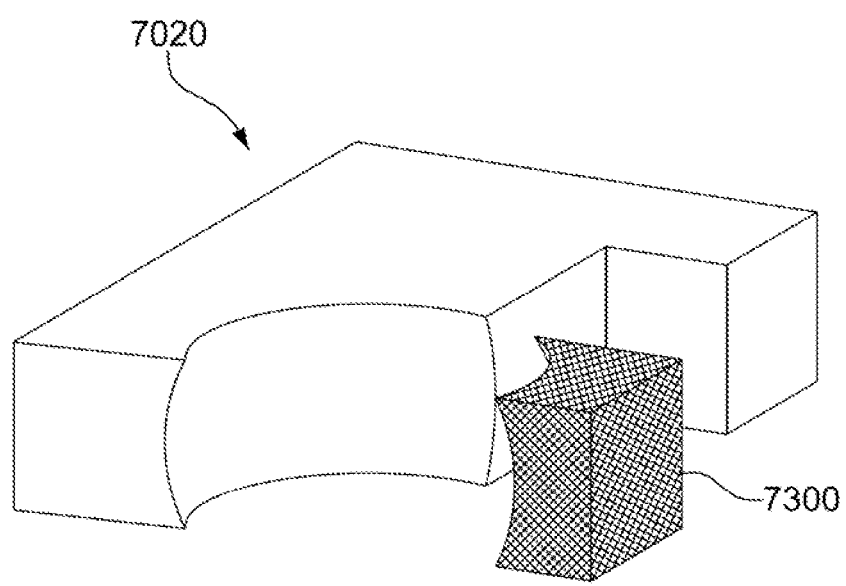

New rendering faces are computed from the impact 7010 and define three new polygon meshes 7020, 7200 and 7300 from the polygon mesh 7000, as depicted on FIG. 7D. For the sake of illustration, FIG. 7D show the polygon meshes 7200 and 7300 detached from the polygon mesh 7020. The new rendering faces may be appended to the connectivity graph into an updated connectivity graph (not shown). The new rendering faces may also be marked differently (e.g., timestamp and/or specific indication) in the connectivity graph (e.g., to be able to locate them more quickly for a subsequent application of a specific damage mask/texture, to undo the procedure, etc.). In the example of FIG. 7, the polygon mesh 7200 is removed in a manner similar to the example of FIG. 6.

In the example of FIG. 7, traversal of the updated connectivity graph will allow for the determination that the triangles from the polygon mesh 7300 have no connectivity path reaching the previously defined anchor point X. The rendering faces from polygon mesh 7300 are this removed from the connectivity graph at the same time or subsequently to polygon mesh 7200. From the perspective of the user, the resulting polygon mesh 7020 should appear in a plausible manner. As mentioned before, special effects may be triggered to cover the removal of the polygon mesh(es) 7200 and/or 7300.

The processor module 1230 may represent a single processor with one or more processor cores or an array of processors, each comprising one or more processor cores. The memory module 1220 may comprise various types of memory (different standardized or kinds of Random Access Memory (RAM) modules, memory cards, Read-Only Memory (ROM) modules, programmable ROM, etc.). The network interface module 1210 represents at least one physical interface that can be used to communicate with other network nodes. The network interface module 1210 may be made visible to the other modules of the computer system 1200 through one or more logical interfaces. The actual stacks of protocols used by the physical network interface(s) and/or logical network interface(s) of the network interface module 1210 do not affect the teachings of the present invention. The variants of processor module 1230, memory module 1220, network interface module 1210 and storage devices module 1500 usable in the context of the present invention will be readily apparent to persons skilled in the art. Likewise, even though explicit mentions of the memory module 1220 and/or the processor module 1230 are not made throughout the description of the present examples, persons skilled in the art will readily recognize that such modules are used in conjunction with other modules of the computer system 1200 to perform routine as well as innovative steps related to the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for rendering damaged-enhanced images in an interactive computer simulation comprising:
   during the interactive computer simulation comprising an interactive computer generated environment, receiving an input from a user of the interactive computer simulation for triggering a virtual impact having an effective radius;
   determining coordinates of the virtual impact on at least one three dimensional (3D) polygon mesh of the interactive computer generated environment;
   simplifying calculation of at least one newly formed 3D polygon mesh from the virtual impact at the coordinates by:
      removing a portion of a sphere, computed from the effective radius, from the at least one 3D polygon mesh of the computer generated environment, thereby defining the at least one newly formed 3D polygon mesh; and
   rendering at least one damaged-enhanced image for display of the at least one newly formed 3D polygon mesh from a field of view of the user of the interactive computer simulation.

2. The method for rendering the damaged-enhanced images of claim 1, wherein the simplified calculation of the at least one newly formed 3D polygon mesh is performed in real-time priority processing.

3. The method for rendering the damaged-enhanced images of claim 2, wherein the simplified calculation of the at least one newly formed 3D polygon mesh is performed by a decentralized processing unit in a limited number of milliseconds, wherein the decentralized processing unit is associated with an interactive simulated vehicle of the interactive computer generated environment, wherein the field of view is defined from a position of the user within the interactive simulated vehicle.

4. The method for rendering the damaged-enhanced images of claim 3, further comprising:
   at a centralized processing unit, computing the at least one newly formed 3D polygon mesh from the determined coordinates, wherein computing is performed independently from the decentralized processing unit and in non-real-time priority processing; and
   persistently updating a storage module associated to the interactive computer simulation with the at least one newly formed 3D polygon mesh.

5. The method for rendering the damaged-enhanced images of claim 4, further comprising loading, at a second decentralized processing unit of the interactive computer simulation, the at least one newly formed 3D polygon mesh data from the storage module, the second decentralized processing unit being associated with a second interactive simulated vehicle of the interactive computer generated environment having a second field of view defined from a second user's position within the second interactive simulated vehicle.

6. The method for rendering the damaged-enhanced images of claim 1, further comprising, before beginning the interactive computer simulation:
   loading the interactive computer generated environment from a storage module; and identifying one or more opened polygon meshes forming non-watertight meshes in the interactive computer generated environment.

7. The method for rendering the damaged-enhanced images of claim 5, further comprising:
for each identified opened polygon mesh, attempting to close the corresponding polygon mesh and, if not possible, marking the corresponding polygon mesh as un-damageable; and
prior to removing the portion of a sphere, verifying that the at least one 3D polygon mesh is not marked as un-damageable in the database.

8. The method for rendering the damaged-enhanced images of claim 1, further comprising, before removing the portion of a sphere, determining that each of the at least one 3D polygon mesh forms a watertight mesh.

9. The method for rendering the damaged-enhanced images of claim 1, further comprising, after determining the coordinates, rendering at least one temporary image for display comprising a distracting visual effect at the determined coordinates at least until rendering the at least one damaged-enhanced image is performed.

10. The method for rendering the damaged-enhanced images of claim 1, wherein rendering the at least one damaged-enhanced image further comprises applying a damage texture, fading outwardly from the coordinates and exceeding the effective radius, on the at least one newly formed 3D polygon mesh.

11. A computer system for rendering damaged-enhanced images in an interactive computer simulation comprising:
a processor module for:
i. during the interactive computer simulation comprising an interactive computer generated environment, receiving an input from a user of the interactive computer simulation for triggering a virtual impact having an effective radius;
ii. determining coordinates of the virtual impact on at least one three dimensional (3D) polygon mesh of the interactive computer generated environment;
iii. simplifying calculation of at least one newly formed 3D polygon mesh from the virtual impact at the coordinates by:
removing a portion of a sphere, computed from the effective radius, from the at least one 3D polygon mesh of the computer generated environment, thereby defining the at least one newly formed 3D polygon mesh; and
the processor module comprising an image generator module for:
iv. rendering at least one damaged-enhanced image for display of the at least one newly formed 3D polygon mesh from a field of view of the user of the interactive computer simulation.

12. The computer system of claim 11, wherein the processor module performs the simplified calculation of the at least one newly formed 3D polygon mesh in real-time priority processing.

13. The computer system of claim 12, wherein the simplified calculation of the at least one newly formed 3D polygon is performed by a decentralized processing unit associated with an interactive simulated vehicle of the interactive computer generated environment, wherein the field of view is defined from a position of the user within the interactive simulated vehicle.

14. The computer system of claim 13, wherein a centralized processing unit is for:
computing the at least one newly formed 3D polygon mesh from the determined coordinates, wherein computing is performed independently from the decentralized processing unit and is performed in non-real-time priority processing; and
storing the computed at least one newly formed 3D polygon mesh in a storage module associated with the interactive computer simulation.

15. The computer system of claim 14, wherein a second decentralized processing unit obtains the at least one newly formed 3D polygon mesh data from the storage module, the second decentralized processing unit being associated with a second interactive simulated vehicle of the interactive computer generated environment having a field of view defined from a second user's position within the second interactive simulated vehicle.

16. The computer system of claim 11, wherein the processor module is further for, before beginning the interactive computer simulation, loading the interactive computer generated environment from a memory module and for identifying one or more opened polygon meshes forming non-watertight meshes in the interactive computer generated environment.

17. The computer system of claim 16, wherein the processor module is further:
for each identified opened polygon mesh, for attempting to close the corresponding polygon mesh and, if not possible, marking the corresponding polygon mesh as un-damageable in the storage module; and
prior to removing the portion of a sphere, for verifying that the at least one 3D polygon mesh is not marked as un-damageable in the storage module.

18. The computer system of claim 11, wherein the processor module is further for, before removing the portion of a sphere, determining that each of the at least one 3D polygon mesh forms a watertight mesh.

19. The computer system of claim 11, wherein the image generator module is further for, after determination of the coordinates by the processor module, rendering at least one temporary image for display comprising a distracting visual effect at the determined coordinates at least until rendering the at least one damaged-enhanced image is performed.

20. The computer system of claim 11, wherein the image generator module renders the at least one damaged-enhanced image by further applying a damage texture, fading outwardly from the coordinates and exceeding the effective radius, on the at least one newly formed 3D polygon mesh.

* * * * *